(12) United States Patent
Wu et al.

(10) Patent No.: US 12,325,329 B2
(45) Date of Patent: Jun. 10, 2025

(54) BATTERY SYSTEM WITH ADJUSTABLE HEATING RATE AND CONTROL METHOD THEREOF

(71) Applicant: RISESUN MENGGULI NEW ENERGY SCIENCE & TECHNOLOGY CO., LTD, Beijing (CN)

(72) Inventors: Ningning Wu, Beijing (CN); Yongzhi Mao, Beijing (CN); Changxin Guo, Beijing (CN)

(73) Assignee: RISESUN MENGGULI NEW ENERGY SCIENCE & TECHNOLOGY CO., LTD, Beijing (CN)

( * ) Notice: Subject to any disclaimer, the term of this patent is extended or adjusted under 35 U.S.C. 154(b) by 982 days.

(21) Appl. No.: 16/754,873

(22) PCT Filed: Dec. 5, 2018

(86) PCT No.: PCT/CN2018/119302
§ 371 (c)(1),
(2) Date: Jun. 9, 2021

(87) PCT Pub. No.: WO2020/107507
PCT Pub. Date: Jun. 4, 2020

(65) Prior Publication Data
US 2021/0323442 A1 Oct. 21, 2021

(30) Foreign Application Priority Data
Nov. 27, 2018 (CN) .......................... 201811424616.6

(51) Int. Cl.
*B60L 58/27* (2019.01)
*B60L 1/02* (2006.01)
(Continued)

(52) U.S. Cl.
CPC ................. *B60L 58/27* (2019.02); *B60L 1/02* (2013.01); *B60L 3/0046* (2013.01); *B60L 3/0084* (2013.01); *B60L 3/12* (2013.01); *B60L 2240/545* (2013.01); *B60L 2240/547* (2013.01); *B60L 2240/549* (2013.01)

(58) Field of Classification Search
CPC .......... B60L 58/27; B60L 1/02; B60L 3/0046; B60L 3/0084; B60L 3/12
See application file for complete search history.

(56) References Cited

U.S. PATENT DOCUMENTS

2010/0288745 A1 11/2010 Brust et al.
2012/0217933 A1 8/2012 Abe et al.
(Continued)

FOREIGN PATENT DOCUMENTS

| CN | 101522448 A | 9/2009 | |
|---|---|---|---|
| CN | 103419666 A | * 12/2013 | .......... H01M 10/615 |

(Continued)

*Primary Examiner* — Karie O'Neill Apicella
(74) *Attorney, Agent, or Firm* — FISHERBROYLES, LLP; Roger L. Browdy; James E. Mrose

(57) ABSTRACT

The present disclosure relates to a battery system with adjustable heating rate and control method thereof, the battery system comprises a battery pack, a heating plate, a power control module, and a battery management system; when the temperature of the battery pack is lower than the preset self-heating switch-on temperature, the power control module is turned on, and the battery management system transmits the collected status information of the battery pack to the power control module, the power control module adjusting the current on-off time and switching frequency of the heating plate through a PWM signal to adjust the heating power and heating rate, to realize self-heating of the battery; when the temperature of the battery pack reaches the preset self-heating switch-off temperature, the power control module is turned off to stop heating; wherein, the power control module further includes a current adjustment module, a current acquisition module, and a heating control module.

(Continued)

The present disclosure can realize the beneficial effects of fast heating rate, long driving range, and fast charging at low temperature of the power battery system.

11 Claims, 2 Drawing Sheets

(51) Int. Cl.
*B60L 3/00* (2019.01)
*B60L 3/12* (2006.01)

(56) References Cited

U.S. PATENT DOCUMENTS

| | | |
|---|---|---|
| 2013/0188665 A1 | 7/2013 | Namou et al. |
| 2014/0045028 A1* | 2/2014 | Moon .................. H01M 50/211 |
| | | 429/120 |
| 2018/0281618 A1 | 10/2018 | Okaki et al. |
| 2019/0363408 A1 | 11/2019 | Dan et al. |

FOREIGN PATENT DOCUMENTS

| | | |
|---|---|---|
| CN | 205407304 U | 7/2016 |
| CN | 106553559 A | 4/2017 |
| CN | 106602179 A | 4/2017 |
| CN | 107512180 A | 12/2017 |
| CN | 108028443 A | 5/2018 |
| CN | 108736108 A | 11/2018 |
| JP | 2013-77452 A | 4/2013 |
| WO | 2011/074330 A1 | 6/2011 |
| WO | 2014/005470 A1 | 1/2014 |
| WO | 2017/056162 A1 | 4/2017 |

* cited by examiner

BATTERY SYSTEM WITH ADJUSTABLE HEATING RATE AND CONTROL METHOD THEREOF

TECHNICAL FIELD

The disclosure relates to the technical field of batteries of electric vehicles, and particularly relates to a battery system with adjustable heating rate and control method thereof.

BACKGROUND

With the rapid development of the new energy industry, electric vehicles have spread all over of the world. The core of the electric vehicle is the battery system. The charge and discharge performance of the battery system greatly affects the power and economy of the electric vehicle. On one hand, under low temperature conditions, the battery system has low charge and discharge power, which greatly affects the dynamic performance, driving range, and charging time of the electric vehicle, so as that users complain a lot; on other hand, although electric vehicles applied to regions of low temperature have heating systems and thermal insulation systems in their battery systems, they also suffer from problems of low heating power, low rate, and poor thermal insulation.

The two reasons mentioned above have severely affected the use and promotion of electric vehicles in low temperature areas, and have severely affected the customer experience. Therefore, in order to solve the above two problems, it is necessary to develop a safe and reliable battery system with fast self-heating and adjustable heating rate.

SUMMARY

An object of the present disclosure is to provide a battery system with adjustable heating rate and a control method thereof in consideration of the above problems, to solve the problems that the heating power of the battery system is inadaptable and the heating rate thereof is low in the prior art, and to achieve the technical effect of high heating rate, low failure rate, low maintenance difficulty and higher safety of the battery system.

The technical solution of the present disclosure is implemented as follows:

A battery system with adjustable heating rate, the battery system comprises a battery pack, a heating plate, a power control module, and a battery management system;

wherein, the battery pack is electrically connected to the heating plate and the power control module, respectively; the power control module is electrically connected to the battery pack, the heating plate, and the battery management system, respectively;

when the temperature of the battery pack is lower than the preset self-heating switch-on temperature, the power control module is turned on, and the battery management system transmits the collected status information of the battery pack to the power control module, the power control module adjusting the current on-off time and frequency of the heating plate through a PWM (Pulse Width Modulation) signal to adjust the heating power and heating rate, to realize self-heating of the battery; when the temperature of the battery pack reaches the preset self-heating switch-off temperature, the power control module is turned off to stop heating;

wherein, the power control module further includes a current adjustment module, a current acquisition module, and a heating control module; the current adjustment module is electrically connected with the heating plate, the current acquisition module and the heating control module to adjust the current passing through the heating plate, in order to adjust the heating power of the system; the heating control module is electrically connected with the current acquisition module, the current adjustment module and the battery management system, and the heating control module performs information interaction with the battery management system, the heating control module sends a current adjustment command to the current adjustment module, and the heating control module reads the heating current collected by the current acquisition module.

The status information of the battery pack collected by the battery management system is specifically the highest voltage of battery cells, the average voltage of battery cells, the lowest voltage of battery cells, the highest temperature of battery cells, the lowest temperature of battery cells, the voltage difference of battery cells, the overall voltage of the battery pack, the overall temperature of the battery pack, the insulation status of the battery pack, and the battery heating operation mode etc., all of which are used to set the heating power to the current adjustment module.

Further, the battery management system and the heating control module perform information interaction, specifically, the battery management system sends vehicle status information and requirement of heating operation mode to the heating control module, the heating operation mode includes parking heating mode, driving heating mode, DC charging heating mode, and AC charging heating mode. Wherein the DC charging heating mode and the AC charging heating mode achieve charging and heating through a charger. There are two operating modes to choose from, one is: the charger provides high voltage to the heating plate for heating alone, and the other is: the charger provides high voltage power to the battery pack and the heating plate at the same time.

The battery management system calculates the collected status information of the battery pack, selects the present heating operation mode, and sends the present heating operation mode to the heating control module. During the heating process, the battery management system sends the current status information of the battery pack to the heating control module in real time.

Further, the current adjustment module comprises a switching electronic component, an isolated driving unit, and an isolated power source, and the current on-off time of heating and frequency of the switches are controlled by a PWM signal;

wherein, the switching electronic component is an electronic component with breakover and shutdown functions or with adjustable conduction angle, such as any one of IGBT (Insulated gate bipolar transistor), MOSFET (Metal-oxide semiconductor field effect transistor), thyristor, relay, etc. Preferably, when the current adjustment module is an IGBT (Insulated Gate Bipolar Transistor), its circuit specifically includes an isolated driving unit, an isolated power source, and an IGBT (Insulated Gate Bipolar Transistor). After the PWM signal output by the processing power control module passes the isolated driving unit, the control signal of IGBT (Insulated Gate Bipolar Transistor) is generated, and the isolated driving unit is powered by the isolated power source.

Further, the current acquisition module comprises a Hall sensor, an LDO (Low Drop output regulator), a port protection circuit, and a signal adjustment circuit, the Hall sensor transmits the collected current signal to the interface of the current acquisition module after passing through the port protection circuit and the signal adjustment circuit. The Hall sensor divides the transmission channel of the collected current signal into a high-range channel and a low-range channel. Wherein, the high-range channel transmits the high-frequency current signal to the first interface of the current acquisition module through the first port protection circuit and the first signal adjustment circuit. The low-range channel transmits the low-frequency current signal to the second interface of the current acquisition module through the second port protection circuit and the second signal adjustment circuit.

Further, the heating control module controls the current adjustment module through a PWM signal, and the heating control module includes an MCU controller, a power circuit, a clock, a CAN communication chip, a current adjustment module interface, a current acquisition module interface, and a battery management system interface; the MCU controller is connected to the battery management system interface through the CAN communication chip, the MCU controller is connected to the current adjustment module interface through a PWM generation module, and the MCU controller is connected to the current acquisition module interface through an ADC channel.

Further, the heating plate is one or more of a nickel sheet, a copper sheet, an aluminum sheet, an iron sheet, a graphite sheet, a PTC heating device or a heating film.

Further, the heating plate is formed by a plurality of individual heating plate units connected in series, in parallel, or in series and parallel; the heating plate is arranged inside a cell, outside a cell, at the bottom of the module of the battery pack, at the top of the module of the battery pack, or at the side of the module of the battery pack.

Further, the battery pack is formed by a plurality of cells connected in series, parallel, or in series and parallel; wherein, a cell is one of a lithium iron phosphate battery, a ternary lithium battery, a lithium manganate battery, a solid lithium battery, a nickel-hydrogen battery, a nickel-cadmium battery, a silver-zinc battery, a fuel cell, or a lead-acid battery. Preferably, the number of the cells is 1 to 9999.

The present disclosure also relates to a control method of the battery system with adjustable heating rate, comprising the following steps:

step 1): initialize the battery system with adjustable heating rate, collect information of the present battery pack in real time through the battery management system, calculate the collected information of the battery pack, select the heating operation mode of the present battery pack, the battery management system sends the status information and the heating operation mode of the battery pack required by the heating control module to the heating control module; the heating operation mode includes parking heating mode, driving heating mode, DC charging heating mode, and AC charging heating mode;

step 2): the heating control module switches the heating control module to the corresponding heating operation mode according to the received information of the heating operation mode of the battery pack; the heating control module sends the corresponding PWM signal to the current adjustment module according to the parameters set by the present heating operation mode to adjust the current value of the heating circuit in real time; the heating control module receives the current value fed back by the current acquisition module and adjusts the PWM signal to make the actual current to reach a set value to implement a closed-loop control, and at the same time, diagnoses whether there is a fault in the heating circuit; if there is a fault, determines whether to stop the present heating operation mode or reduce the heating power according to the failure level; if there is no fault, continue with the present heating operation mode;

step 3): when the temperature, temperature difference, voltage difference of the cell in the battery pack reach the preset thresholds, or when the voltage and the insulation resistance of the cell are lower than the preset thresholds, an alarm is issued, the heating control module sends a control command that the heating power is equal to zero to the current adjustment module;

step 4): send a request to turn off the heating operation mode to the battery management system, exit the present heating operation mode after confirmation; and return to step 1).

Further, the heating control module determines whether there is a fault in the heating plate, the current adjustment module, and the current acquisition module, the current adjustment module responds to an operation of faulty of the heating control module. Compared with the prior art, the present disclosure has the following beneficial effects:

The heating plate, the current adjustment module, the current acquisition module, the heating control module, and the battery management system are adaptively set, and the heating operation mode is divided into parking heating mode, driving heating mode, DC charging heating mode, and AC charging heating mode, so as to solve the problems of low heating efficiency, single heating method, and inadaptable heating power of the battery pack in the prior art, and to realize the beneficial effects of fast heating rate, long driving range, and fast charging at low temperature of the power battery system.

Other features and advantages of the present disclosure will be explained in the following description, and partly become apparent from the description, or be understood by implementing the present disclosure.

The technical solutions of the present disclosure will be described in further detail below with reference to the drawings and embodiments.

Figure 1:
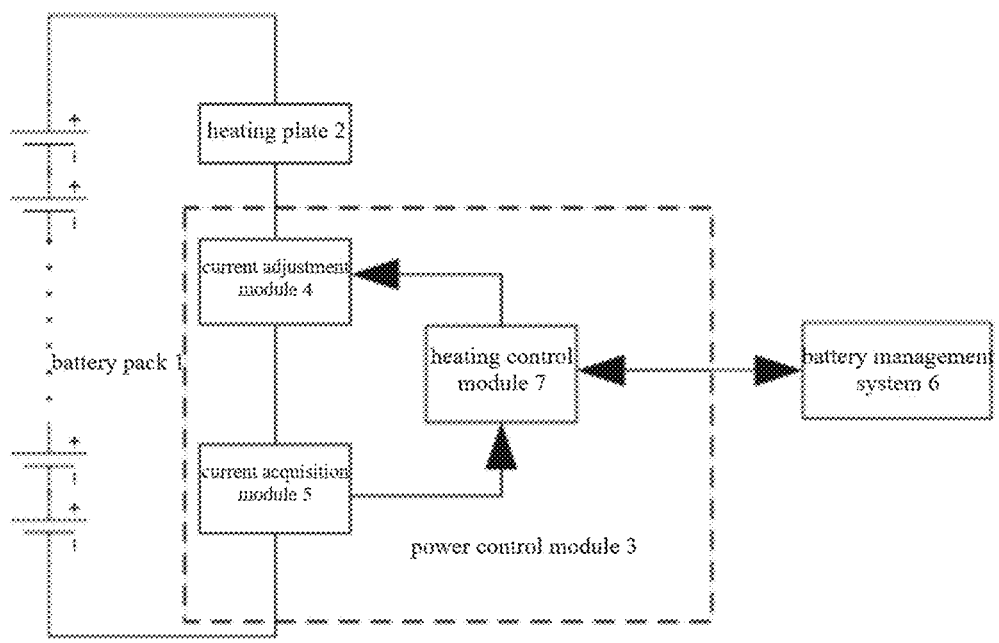
FIG. 1 is a schematic diagram of a battery system with adjustable heating rate according to the present disclosure.

Wherein, battery pack 1, heating plate 2, power control module 3, current adjustment module 4, current acquisition module 5, battery management system 6, heating control module 7.

DETAILED DESCRIPTION OF THE EMBODIMENTS

The present disclosure is described in detail below with reference to specific embodiments. The following embodiments will help those skilled in the art to further understand the present disclosure, but do not limit the present disclosure in any form.

Figure 2:
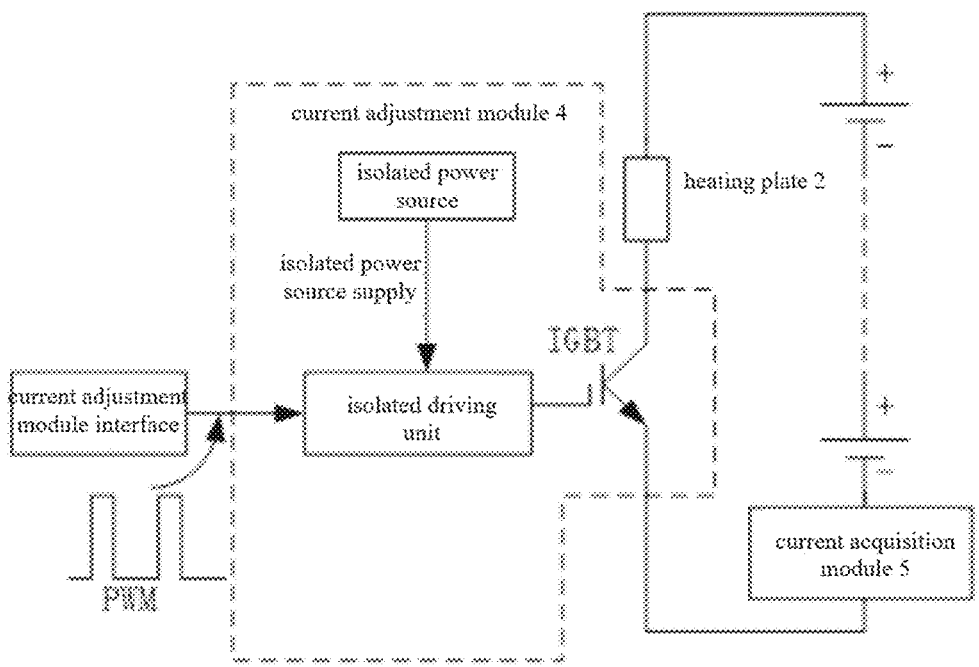
FIG. 2 is a schematic circuit diagram of a current adjustment module according to the present disclosure.
Figure 3:
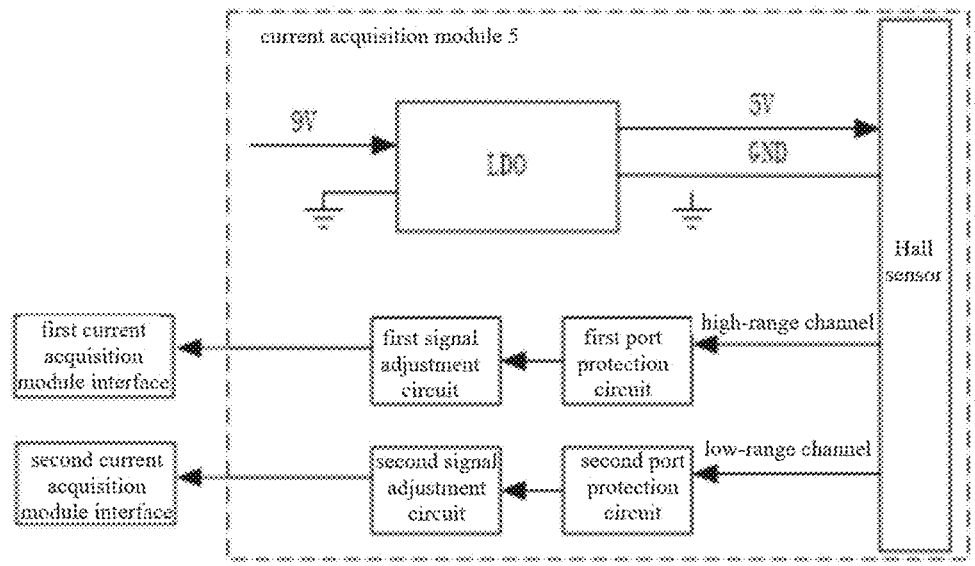
FIG. 3 is a schematic diagram of a related circuit of a current acquisition module according to the present disclosure.
Figure 4:
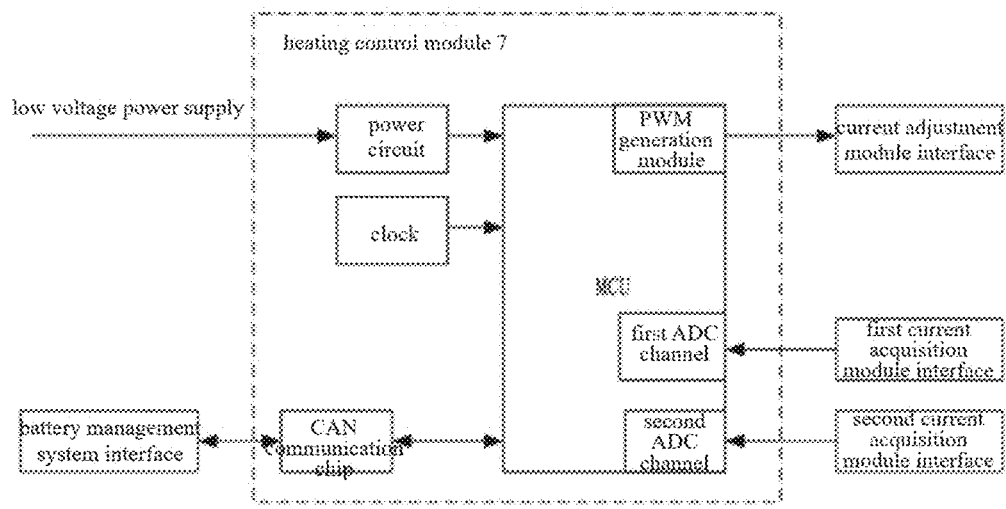
FIG. 4 is a schematic circuit diagram of a heating control module according to the present disclosure.

As illustrated in FIG. 1-FIG. 4, a battery system with adjustable heating rate, the battery system comprises a battery pack 1, a heating plate 2, a power control module 3, and a battery management system 6; wherein, the battery pack 1 is electrically connected to the heating plate 2 and the power control module 3, respectively; the power control module 3 is electrically connected to the battery pack 1, the heating plate 2, and the battery management system 6, respectively.

When the temperature of the battery pack 1 is lower than the preset self-heating switch-on temperature, the power control module 3 is turned on, and the battery management system 6 transmits the collected status information of the battery pack 1 to the power control module 3, the power control module 3 adjusting the current on-off time and frequency of the heating plate 2 through a PWM (Pulse Width Modulation) signal to adjust the heating power and heating rate, to realize self-heating of the battery; when the temperature of the battery pack 1 reaches the preset self-heating switch-off temperature, the power control module 3 is turned off to stop heating;

wherein, the power control module 3 further includes a current adjustment module 4, a current acquisition module 5, and a heating control module 7; the current adjustment module 4 is electrically connected with the heating plate 2, the current acquisition module 5 and the heating control module 7 to adjust current passing through the heating plate 2, in order to adjust the heating power of the system; the heating control module 7 is electrically connected with the current acquisition module 5, the current adjustment module 4 and the battery management system 6, and the heating control module 7 performs information interaction with the battery management system 6, the heating control module 7 sends a current adjustment command to the current adjustment module 4, and the heating control module 7 reads the heating current collected by the current acquisition module 5.

The status information of the battery pack 1 collected by the battery management system 6 is specifically the highest voltage of battery cells, the average voltage of battery cells, the lowest voltage of battery cells, the highest temperature of battery cells, the lowest temperature of a battery cell, the voltage difference of battery cells, the overall voltage of the battery pack 1, the overall temperature of the battery pack 1, the insulation status of the battery pack 1, and the battery heating operation mode, all of which are used to set the heating power to the current adjustment module 4.

The battery management system 6 and the heating control module 7 perform information interaction, specifically, the battery management system 6 sends vehicle status information and requirement of heating operation mode to the heating control module 7, the heating operation mode includes parking heating mode, driving heating mode, DC charging heating mode, and AC charging heating mode. There are two operating modes to choose from for the DC charging heating mode and AC charging heating mode, one is: provide high voltage to the heating plate 2 for heating alone by a charger, and the other is: the charger provides high voltage power to the battery pack 1 and the heating plate 2 at the same time.

The battery management system 6 calculates the collected status information of the battery pack 1, selects the present heating operation mode, and sends the present heating operation mode to the heating control module 7. During the heating process, the battery management system 6 sends the current status information of the battery pack 1 to the heating control module 7 in real time.

The current adjustment module 4 comprises a switching electronic component, an isolated driving unit, and an isolated power source, and the current on-off time of heating is controlled by a PWM signal; wherein, the switching electronic component is an electronic component with breakover and shutdown functions or with adjustable conduction angle, such as any one of IGBT (Insulated gate bipolar transistor), MOSFET (Metal-oxide semiconductor field effect transistor), thyristor, relay, etc. Preferably, when the current adjustment module 4 is an IGBT (Insulated Gate Bipolar Transistor), the current adjustment module 4 specifically includes an isolated driving unit, an isolated power source, and an IGBT (Insulated Gate Bipolar Transistor). After the PWM signal output by the power control module 7 passes the isolated driving unit, the control signal of IGBT (Insulated Gate Bipolar Transistor) is generated, and the isolated driving unit is powered by the isolated power source. The current acquisition module 5 comprises a Hall sensor, an LDO (Low Drop Output), a port protection circuit, and a signal adjustment circuit, the Hall sensor transmits the collected current signal to an ADC channel after passing through the port protection circuit and the signal adjustment circuit. Specifically, the Hall sensor divides the transmission channel of the collected current signal into a high-range channel and a low-range channel. Wherein, the high-range channel transmits the high-frequency current signal to the first interface of the current acquisition module through the first port protection circuit and the first signal adjustment circuit. The low-range channel transmits the low-frequency current signal to the second interface of the current acquisition module through the second port protection circuit and the second signal adjustment circuit.

The heating control module 7 controls the current adjustment module 4 through a PWM signal, and the heating control module 7 includes an MCU controller, a power circuit, a clock, a CAN communication chip, a current adjustment module interface, a current acquisition module interface, and a battery management system interface; the MCU controller is connected to the battery management system interface through the CAN communication chip, the MCU controller is connected to the current adjustment module interface through a PWM generation module, and the MCU controller is connected to the current acquisition module interface through an ADC channel.

The heating plate 2 is one or more of a nickel sheet, a copper sheet, an aluminum sheet, an iron sheet, a graphite sheet, a PTC heating device or a heating film.

The heating plate 2 is formed by a plurality of individual heating plate units connected in series, in parallel, or in series and parallel; the heating plate 2 is arranged inside a cell, outside a cell, at the bottom of the module of the battery pack 1, at the top of the module of the battery pack 1, or at the side of the module of the battery pack 1.

The battery pack 1 is formed by a plurality of cells connected in series, parallel, or in series and parallel; wherein, a cell is one of a lithium iron phosphate battery, a ternary lithium battery, a lithium manganate battery, a solid lithium battery, a nickel-hydrogen battery, a nickel-cadmium battery, a silver-zinc battery, a fuel cell, or a lead-acid battery. Preferably, the number of the cells is 1 to 9999.

A control method of the battery system with adjustable heating rate, comprising the following steps:

step 1): initialize the battery system with adjustable heating rate, collect information of the present battery pack 1 in real time through the battery management system 6, calculate the collected information of the battery pack 1, select the heating operation mode of the present battery pack 1, the battery management system 6 sends the status information and the heating operation mode of the battery pack 1 required by the heating control module 7 to the heating control module 7; the heating operation mode includes parking heating mode, driving heating mode, DC charging heating mode, and AC charging heating mode;

step 2): the heating control module 7 switches the heating control module to the corresponding heating operation mode according to the received information of the heating operation mode of the battery pack 1; the heating control module 7 sends the corresponding PWM signal to the current adjustment module 4 according to the parameter set by the present heating operation mode to adjust the current value of the heating circuit in real time; the heating control module 7 receives the current value fed back by the current acquisition module 5 and adjusts the PWM signal to make the actual current to reach a set value to implement a closed-loop control, and at the same time, diagnoses whether there is a fault in the heating circuit; if there is a fault, determines whether to stop the present heating operation mode or reduce the heating power according to the failure level; if there is no fault, continue with the present heating operation mode;

step 3): when the temperature, temperature difference, voltage difference of the cell in the battery pack 1 is higher than the preset thresholds, or when the voltage and the insulation resistance of the cell are lower than the preset thresholds, an alarm is issued, the heating control module 7 sends a control command that the heating power is equal to zero to the current adjustment module 4;

step 4): send a request to turn off the heating operation mode to the battery management system 6, exit the present heating operation mode after confirmation; and return to step 1).

Further, the heating control module 7 determines whether there is a fault in the heating plate 2, the current adjustment module 4, and the current acquisition module 5, the current adjustment module 4 responds to an operation of faulty of the heating control module 7.

In order to verify the technical effects of the present disclosure, the following specific embodiments are used for description.

Example 1

The cell is a lithium ion battery, the cell capacity is 70 Ah, the rated voltage is 3.7V, and the battery system includes 36 strings in series each of which includes 4 cells in parallel. The heating plate 2 is a nickel sheet, the resistance thereof is 80 mΩ, the heating plate 2 is built in the battery. The heating plate 2 includes 36 strings in series each of which includes 4 heating sheets in parallel. The ambient temperature is −20° C. The battery management system 6 sends a parking heating mode to the heating control module 7. After the battery management system 6 sends the heating mode to the heating control module 7, the PWM sends a duty cycle of 100%, the heating control module 7 starts quickly, the IGBT is 100% turned on to heat at the maximum rate. The maximum heating current is 147 A. The temperature of the battery system rises rapidly at the rate of 5° C./min. When the battery temperature reaches the set stop-heating temperature of 10° C., the heating control module 7 stops the heating action and the heating stops. At this point, the battery temperature has reached 10° C. or higher, and the vehicle can start running or be charged.

Example 2

The cell is a lithium ion battery, the cell capacity is 70 Ah, the rated voltage is 3.7V, and the battery system includes 36 strings in series each of which includes 4 cells in parallel. The heating plate 2 is a nickel sheet, the resistance thereof is 80 mΩ, the heating plate 2 is built in the battery. The heating plate 2 includes 36 strings in series each of which includes 4 heating sheets in parallel. The ambient temperature is −20° C. The vehicle is plugged into a DC charger, and the battery management system 6 sends a DC charging heating mode to the heating control module 7. The heating control module 7 sends a PWM duty cycle of 60%, the heating control module 7 starts, controls the IGBT pulse to work, and the heating starts. The heating current is 149 A, the output current of the charger is set to 60 A, and the temperature of the battery system rises rapidly at the rate of 5° C./min. When the battery temperature reaches the charging stop heating temperature of 10° C., the heating control module 7 stops the heating action, the heating stops, and the charger continues to work. The battery management system 6 sends a charging current request of 140 A, and the battery starts charging. The charging stops when charging SOC (state of charge) reaches 100%.

Example 3

The cell is a lithium ion battery, the cell capacity is 70 Ah, the rated voltage is 3.7V, and the battery system includes 36 strings in series each of which includes 4 cells in parallel. The heating plate 2 is a nickel sheet, the resistance thereof is 80 mΩ, the heating plate 2 is built in the battery. The heating plate 2 includes 36 strings in series each of which includes 4 heating sheets in parallel. The ambient temperature is −20° C. The vehicle is plugged into an AC charging gun, and the battery management system 6 sends an AC charging heating mode to the heating control module 7. The heating control module 7 sends a PWM duty cycle of 90%, the heating control module 7 starts, controls IGBT pulse to work, and the heating starts. The heating current is 139 A, the output current of the charger is set to 20 A, and the temperature of the battery system rises rapidly at the rate of 5° C./min. When the battery temperature reaches the charging stop heating temperature of 10° C., the heating control module 7 stops the heating action, the heating stops, and the charger continues to work. The battery management system 6 sends a charging current request of 20 A, and the battery starts charging. The charging stops when charging SOC (state of charge) reaches 100%.

Example 4

The cell is a lithium ion battery, the cell capacity is 70 Ah, the rated voltage is 3.7V, and the battery system includes 168 strings in series each of which includes 4 cells in parallel. The heating plate 2 is a nickel sheet, the resistance thereof is 80 mΩ, the heating plate 2 is built in the battery. The heating plate 2 includes 168 strings in series each of which includes 4 heating sheets in parallel. The ambient temperature is −20° C. The driver starts the vehicle and the vehicle runs at a rate of 10 km/h. The battery management system 6 sends a driving heating mode to the heating control module 7. The heating control module 7 sends a PWM duty cycle of 20%, the heating control module 7 starts, controls the IGBT pulse to work, and the heating starts. The heating current is 29 A, and the temperature of the battery system rises rapidly at the rate of 1° C./min. When the battery temperature reaches the stop heating temperature of 10° C., the heating control module 7 stops the heating action, the heating stops. The vehicle continues to run at a maximum rate of 100 km/h, and the energy recycled from the brakes is normal.

The above are only the preferred embodiments of the present disclosure, and the scope of protection of the present disclosure is not limited to the above. Any equivalent replacement or change of the technical solution of the present disclosure or the disclosure concept, which are made by those skilled in the art within the technical scope disclosed by the present disclosure, should be covered by the protection scope of the present disclosure.

What is claimed is:

1. A battery system with adjustable heating rate, characterized in that, the battery system comprises a battery pack, a heating plate, a power control module, and a battery management system;
   wherein, the battery pack is electrically connected to the heating plate and the power control module, respectively; the power control module is electrically connected to the battery pack, the heating plate, and the battery management system, respectively;
   when the temperature of the battery pack is lower than the preset self-heating switch-on temperature, the power control module is turned on, and the battery management system transmits the collected status information of the battery pack to the power control module, the power control module adjusting the current on-off time and switching frequency of the heating plate through a PWM signal to adjust the heating power and heating rate; when the temperature of the battery pack reaches the preset self-heating switch-off temperature, the power control module is turned off to stop heating;
   wherein, the power control module further includes a current adjustment module, a current acquisition module, and a heating control module;
   wherein the heating control module is electrically connected with the current acquisition module, the current adjustment module and the battery management system, and the heating control module performs information interaction with the battery management system, the heating control module sends a current adjustment command to the current adjustment module, and the heating control module reads the heating current collected by the current acquisition module to implement closed-loop control; and
   wherein the current adjustment module comprises a switching electronic component, an isolated driving unit, and an isolated power source, and the current on-off time of heating is controlled by a PWM signal, the switching electronic component is any one of IGBT, MOSFET, thyristor or relay.

2. The battery system with adjustable heating rate according to claim 1, characterized in that, the battery management system and the heating control module perform information interaction, specifically, the battery management system sends vehicle status information and requirement of heating operation mode to the heating control module, the heating operation mode includes parking heating mode, driving heating mode, DC charging heating mode, and AC charging heating mode; during the heating process, the battery management system sends the current status information of the battery pack to the heating control module in real time.

3. The battery system with adjustable heating rate according to claim 1, characterized in that, the current acquisition module comprises a Hall sensor, an LDO, a port protection circuit, and a signal adjustment circuit, the Hall sensor transmits the collected current signal to the interface of the current acquisition module after passing through the port protection circuit and the signal adjustment circuit.

4. The battery system with adjustable heating rate according to claim 1, characterized in that, the heating control module controls the current adjustment module through a PWM signal, and the heating control module includes an MCU controller, a power circuit, a clock, a CAN communication chip, a current adjustment module interface, a current acquisition module interface, and a battery management system interface; the MCU controller is connected to the battery management system interface through the CAN communication chip, the MCU controller is connected to the current adjustment module interface through a PWM generation module, and the MCU controller is connected to the current acquisition module interface through an ADC channel.

5. The battery system with adjustable heating rate according to claim 1, characterized in that, the heating plate is one or more of a nickel sheet, a copper sheet, an aluminum sheet, an iron sheet, a graphite sheet, a PTC heating device or a heating film.

6. The battery system with adjustable heating rate according to claim 5, characterized in that, the heating plate is formed by a plurality of individual heating plate units connected in series, in parallel, or in series and parallel;
   the heating plate is arranged inside a cell, outside a cell, at the bottom of the module of the battery pack, at the top of the module of the battery pack, or at the side of the module of the battery pack.

7. The battery system with adjustable heating rate according to claim 6, characterized in that, the battery pack is formed by a plurality of cells connected in series, parallel, or in series and parallel; wherein, a cell is one of a lithium iron phosphate battery, a ternary lithium battery, a lithium manganate battery, a solid lithium battery, a nickel-hydrogen battery, a nickel-cadmium battery, a silver-zinc battery, a fuel cell, or a lead-acid battery.

8. A control method of the battery system with adjustable heating rate according to claim 1, comprising the following steps:
   step 1): provide the battery system with adjustable heating rate according to claim 1;
   step 2): initialize the battery system with adjustable heating rate, collect information of the present battery pack in real time through the battery management system, calculate the collected information of the battery pack, select the heating operation mode of the present battery pack, the battery management system sends the status information and the heating operation mode of the battery pack required by the heating control module to the heating control module; the heating operation mode includes parking heating mode, driving heating mode, DC charging heating mode, and AC charging heating mode;
   step 3): the heating control module switches the heating control module to the corresponding heating operation mode according to the received information of the heating operation mode of the battery pack; the heating control module sends the corresponding PWM signal to the current adjustment module according to the parameters set by the present heating operation mode to adjust the current value of the heating circuit in real time; the heating control module receives the current value fed back by the current acquisition module and adjusts the PWM signal to make the actual current to reach a set value to implement a closed-loop control, and at the same time, diagnoses whether there is a fault in the heating circuit; if there is a fault, determines whether to stop the present heating operation mode or reduce the heating power according to the failure level; if there is no fault, continue with the present heating operation mode;

step 4): when the temperature, temperature difference, voltage difference, and heating time of the cell in the battery pack reach the preset thresholds, or when the voltage and the insulation resistance of the cell are lower than the preset thresholds, an alarm is issued, the heating control module sends a control command that the heating power is equal to zero to the current adjustment module;

step 5): send a request to turn off the heating operation mode to the battery management system, exit the present heating operation mode after confirmation; and return to step 2).

9. The control method of the battery system with adjustable heating rate according to claim 8, characterized in that, the heating control module determines whether there is a fault in the heating plate, the current adjustment module, and the current acquisition module, the current adjustment module responds to an operation of faulty of the heating control module.

10. A battery system with adjustable heating rate, characterized in that, the battery system comprises a battery pack, a heating plate, a power control module, and a battery management system;

wherein, the battery pack is electrically connected to the heating plate and the power control module, respectively; the power control module is electrically connected to the battery pack, the heating plate, and the battery management system, respectively;

when the temperature of the battery pack is lower than the preset self-heating switch-on temperature, the power control module is turned on, and the battery management system transmits the collected status information of the battery pack to the power control module, the power control module adjusting the current on-off time and switching frequency of the heating plate through a PWM signal to adjust the heating power and heating rate; when the temperature of the battery pack reaches the preset self-heating switch-off temperature, the power control module is turned off to stop heating;

wherein, the power control module further includes a current adjustment module, a current acquisition module, and a heating control module;

wherein the heating control module is electrically connected with the current acquisition module, the current adjustment module and the battery management system, and the heating control module performs information interaction with the battery management system, the heating control module sends a current adjustment command to the current adjustment module, and the heating control module reads the heating current collected by the current acquisition module to implement closed-loop control; and wherein the current acquisition module comprises a Hall sensor, an LDO, a port protection circuit, and a signal adjustment circuit, the Hall sensor transmits the collected current signal to the interface of the current acquisition module after passing through the port protection circuit and the signal adjustment circuit.

11. A battery system with adjustable heating rate, characterized in that, the battery system comprises a battery pack, a heating plate, a power control module, and a battery management system;

wherein, the battery pack is electrically connected to the heating plate and the power control module, respectively; the power control module is electrically connected to the battery pack, the heating plate, and the battery management system, respectively;

when the temperature of the battery pack is lower than the preset self-heating switch-on temperature, the power control module is turned on, and the battery management system transmits the collected status information of the battery pack to the power control module, the power control module adjusting the current on-off time and switching frequency of the heating plate through a PWM signal to adjust the heating power and heating rate; when the temperature of the battery pack reaches the preset self-heating switch-off temperature, the power control module is turned off to stop heating;

wherein, the power control module further includes a current adjustment module, a current acquisition module, and a heating control module;

wherein the heating control module is electrically connected with the current acquisition module, the current adjustment module and the battery management system, and the heating control module performs information interaction with the battery management system, the heating control module sends a current adjustment command to the current adjustment module, and the heating control module reads the heating current collected by the current acquisition module to implement closed-loop control; and the heating control module controls the current adjustment module through a PWM signal, and the heating control module includes an MCU controller, a power circuit, a clock, a CAN communication chip, a current adjustment module interface, a current acquisition module interface, and a battery management system interface; the MCU controller is connected to the battery management system interface through the CAN communication chip, the MCU controller is connected to the current adjustment module interface through a PWM generation module, and the MCU controller is connected to the current acquisition module interface through an ADC channel.

* * * * *